(12) United States Patent
Berry

(10) Patent No.: US 6,644,081 B1
(45) Date of Patent: Nov. 11, 2003

(54) SYSTEM AND METHOD FOR ADJUSTING HELICOPTER BLADE TRIM TABS

(76) Inventor: Joseph Keith Berry, 1343 Fulmer Rd., Blythewood, SC (US) 29016

( * ) Notice: Subject to any disclaimer, the term of this patent is extended or adjusted under 35 U.S.C. 154(b) by 42 days.

(21) Appl. No.: 10/077,147

(22) Filed: Feb. 15, 2002

(51) Int. Cl.[7] .................................................. B21D 5/04
(52) U.S. Cl. ..................... 72/31.11; 72/308; 72/311; 29/889.6; 33/534
(58) Field of Search .............................. 72/31.11, 31.1, 72/31.01, 308, 311, 319; 29/889.6; 33/501, 534

(56) References Cited

U.S. PATENT DOCUMENTS

| | | | | |
|---|---|---|---|---|
| 1,909,097 A | * | 5/1933 | Damerall ................... | 29/889.6 |
| 2,297,055 A | | 9/1942 | Grad | |
| 2,359,277 A | | 10/1944 | Saunders | |
| 2,393,317 A | * | 1/1946 | Edwards ...................... | 72/293 |
| 2,422,042 A | | 6/1947 | Roberts | |
| 3,161,961 A | * | 12/1964 | Lyna ........................... | 33/533 |
| 3,280,607 A | * | 10/1966 | Esken ......................... | 72/14.9 |
| 3,837,198 A | * | 9/1974 | Higgins ....................... | 72/18.2 |
| 5,055,752 A | * | 10/1991 | Leistensnider et al. ..... | 318/570 |
| 5,111,676 A | | 5/1992 | Ruzicka | |

* cited by examiner

*Primary Examiner*—Daniel C. Crane
(74) *Attorney, Agent, or Firm*—Michael A. Mann; William Y. Klett, III; Nexsen Pruet Jacobs & Pollard, LLC

(57) ABSTRACT

A system and method for adjusting the orientation of trim tabs on a helicopter rotor blade includes a gage, a bender and a calibrator plate. The gage is secured to the calibrator plate which holds the gage in an orientation that simulates a rotor blade with trim tabs at zero degrees so that the gage can be zeroed. The gage is then removed and positioned on a rotor blade. Because the gage is supported on the blade by rollers, it is free to roll along the length of the blade and may thereby be positioned and repositioned quickly. Once in position, the bender is applied to the trim tabs adjacent to the gage and tightened using thumb screws. The handle of the bender allows the trim tabs to be adjusted while verifying that the amount of adjustment indicated by the gage dial indicator matches the preselected angle.

24 Claims, 3 Drawing Sheets

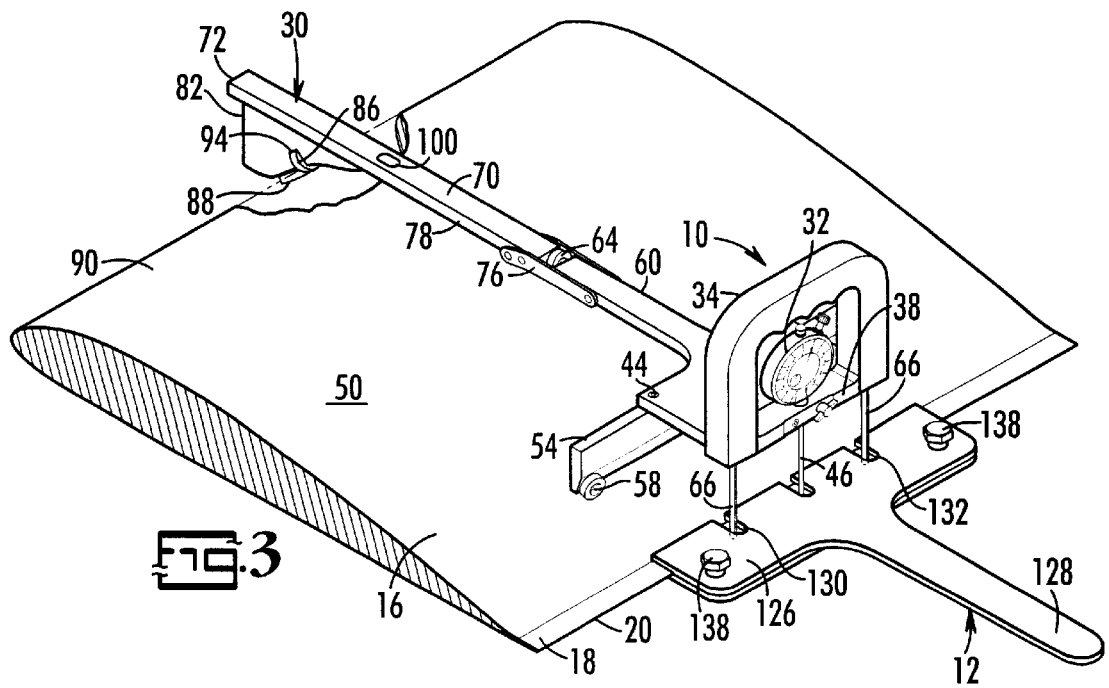
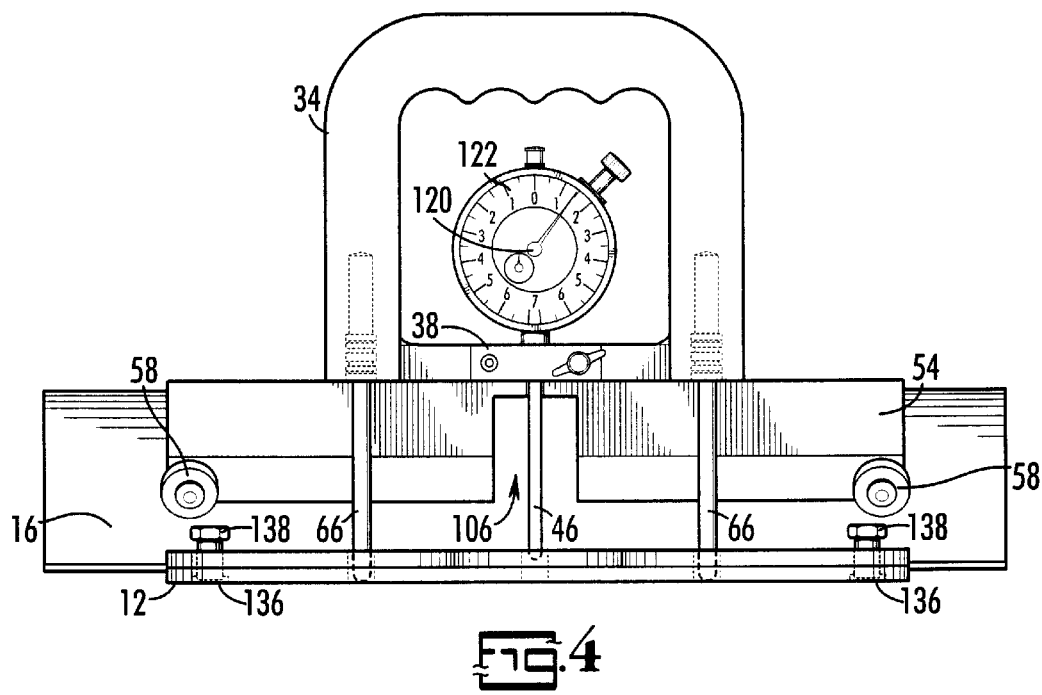

SYSTEM AND METHOD FOR ADJUSTING HELICOPTER BLADE TRIM TABS

FIELD OF THE INVENTION

The present invention relates to maintenance of helicopters in general and to adjusting trim tabs of helicopter rotor blades in particular.

BACKGROUND OF THE INVENTION

Helicopter rotor blades vary in thickness from leading edge to trailing edge. Their trailing edges are tapered to be very thin compared to the balance of the blade, defining what are called "trim tabs." Trim tabs are designed to be bent slightly up or down to reduce low frequency vibrations that would otherwise occur when the rotor blades are rotating. Adjusting the degree of bend in the trim tabs is part of routine helicopter maintenance. Instruments in the helicopter provide information about which rotor blades and which parts of each blade need to be adjusted and the amount of adjustment needed.

There are few devices available to adjust trim tabs, such as those described in U.S. Pat. No. 5,111,676 issued to Ruzicka Jr. et al, and U.S. Pat. No. 2,422,042 issued to Roberts. The device used most often requires considerable time to set up and use. Therefore, there remains a need for an improved system for adjusting trim tabs of helicopter rotor blades.

SUMMARY OF THE INVENTION

According to its major aspects and briefly recited, the present invention is a system and method for adjusting helicopter rotor blade trim tabs. The system permits accurate bending of the tabs.

In particular, the system includes the following major components: a gage with a folding arm, a bender, and a gage calibration plate. The gage arm is folded and then clamped to the gage calibration plate for calibration. The gage calibration plate is formed to simulate a rotor blade with trim tabs oriented at zero degrees, so that the gage, when clamped in place to it, can be zeroed. Once calibrated, the gage is removed from the plate, unfolded, and then placed on the rotor blade. Unlike prior art trim tab bending systems, the present gage is designed to roll freely along the length of the blade so that the operator can easily position it where it is needed. Once the gage is in position, the bender is applied to the trim tabs at that particular location. The gage will indicate to the operator the precise angle at which the tabs are bent. By grasping the bender handle, the operator can bend the trim tabs up or down while observing the degree of bend on the gage. When the trim tabs have been adjusted to the desired angle, the bender is removed and the gage rolled to a different position on the rotor blade for adjustment at the new position.

An important feature of the present invention is the capability of the gage to roll freely along the length of the rotor blade. This feature has the corresponding advantage of allowing the user to position and reposition the gage quickly and easily at any position along the rotor blade.

Another important feature of the present invention is the method of calibration of the gage. This method is simple enough to do prior to adjustment of each blade. Simply by placing the folded gage on the gage calibration plate, locking the gage in place, dropping the depth rod to the plate, and then rotating the gage dial to zero it, the gage is calibrated.

Still another feature of the present invention is the use of a gage that measures bend to ½ of a degree. This allows very accurate adjustments.

Related to this feature is the use of manual bending. With a little experience and keeping an eye on the gage indicator, an operator can quickly develop the skill to accurately adjust the trim tabs using a simple bender.

These and other features and their advantages will become readily apparent to those skilled in helicopter maintenance techniques and equipment from a careful reading of the Detailed Description of Preferred Embodiments, accompanied by the following drawings.

BRIEF DESCRIPTION OF THE DRAWINGS

In the drawings,

FIG. 3 is a perspective view of the trim tab adjustment device in place on a rotor blade, according to a preferred embodiment of the present invention;

FIG. 4 is a front view of a dial indicator of the adjustment device as shown in FIG. 3.

DETAILED DESCRIPTION OF PREFERRED EMBODIMENTS

Figure 1:
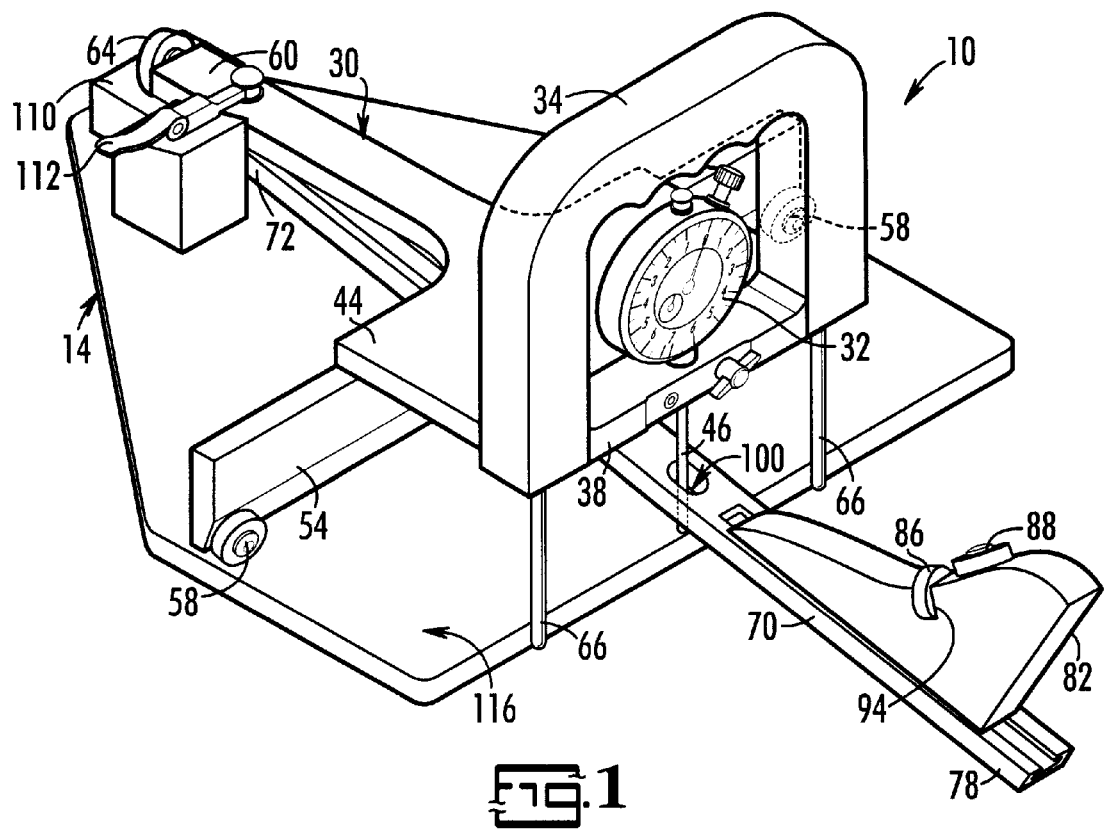
FIG. 1 is a perspective view of the a helicopter rotor blade trim tab adjustment device undergoing calibration, according to a preferred embodiment of the present invention.
Figure 2:
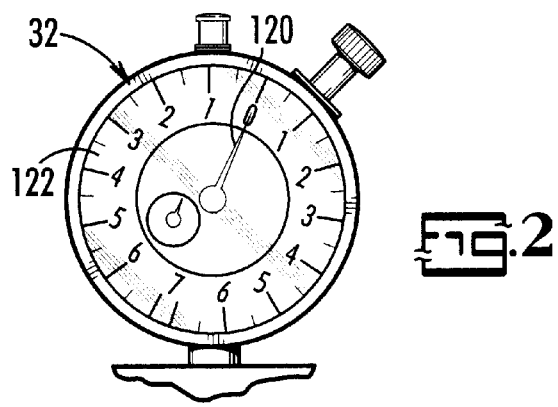
FIG. 2 is a front view of the dial indicator of the trim tab adjustment device shown in FIG. 1.
Figure 5:
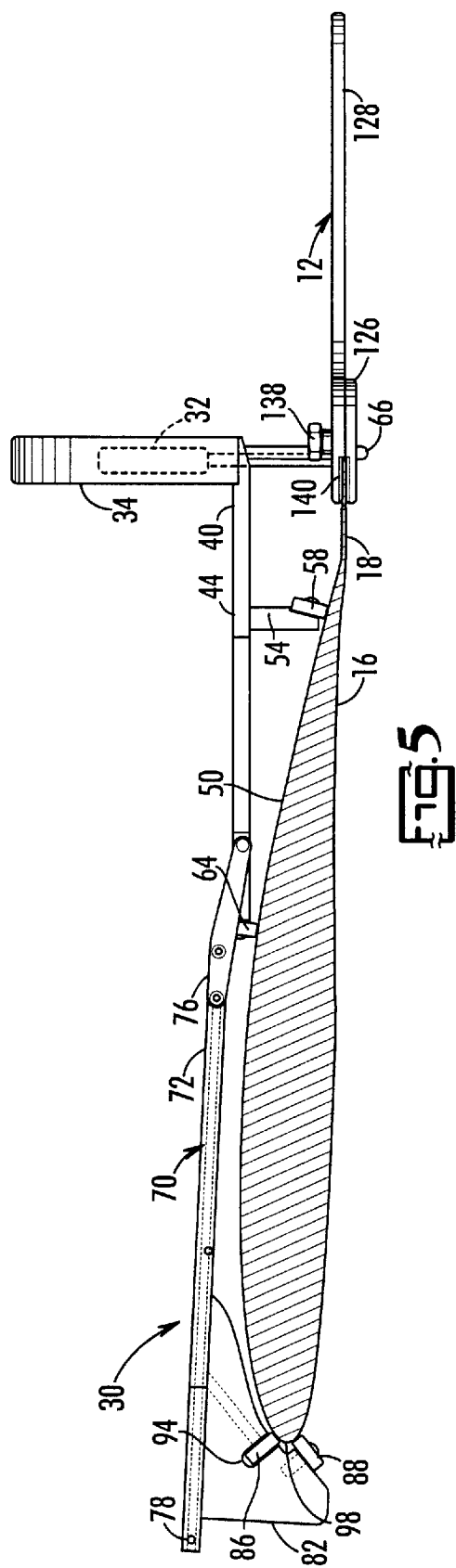
FIG. 5 is a side view of the trim tab adjustment device in place on a rotor blade, according to a preferred embodiment of the present invention.

The present invention is a system and method for adjusting the trim tabs of helicopter rotor blades. The system includes a gage 10, a bender 12 and a gage calibration plate 14 that, together, are used to calibrate gage 10 and then apply it and bender 12 to a rotor blade 16 for accurate bending trim tabs 18 on the trailing edge 20 of blade 16. The method is for using the system for calibrating and bending operations. Although the present system and method is applied to a helicopter rotor blade, the rotor blade is not part of the present invention; it is the work piece on which the system operates.

Trim tabs are a feature of the rotor blade (and thus not the present invention) beginning when the trailing edge has tapered to a uniformly thin band running along the trailing edge of the rotor blade.

Referring now to the figures, the present invention includes gage 10 with a folding arm 30. Gage 10 includes an indicator dial 32 housed within a protective indicator guard 34 that is preferably fluted to fit comfortably the hand of a user. Indicator dial 32 is secured in an indicator adjustment block 38 that is in turn main tool plate 44. Indicator rod 46 depends from indicator dial 32. The relative vertical position of the end of indicator rod 46 determines the angle indicated on indicator dial 32.

This is an important feature. Indicator dial 32 is calibrated in degrees but actually measures distance from indicator dial 32 to the top surface 50 of trim tabs 18. This is possible because the present system is engineered for the particular type of helicopter rotor blade 16 with which it will be used. A modest amount of engineering can be used to adjust indicator dial 32, gage 10 and bender 12 for other types of helicopter rotor blades. Importantly, however, the user, who needs to adjust trim tabs 18 by a known angle, can read that angle directly from indicator dial 32 and does not need to convert distance to angles.

Main tool plate 44 is supported by the upper surface of rotor blade 16 using a remote wheel support arm 54 that carries a roller 58. Roller 58 is adapted to engage top surface 50 of rotor blade 16 and roll freely when gage 10 is moved along the major dimension of rotor blade 16 (running from rotor hub to blade tip). Main tool plate 44 has a second end 60, opposing first end 40 to which indicator dial 32 is attached, that also carries a roller 64 for engaging rotor blade 16, when gage 10 is applied to the rotor blade 16.

First end 40 of main tool plate 44 also has two guide pins 66 depending from indicator guard 34. Guide pins 66 extend below trim tabs 18 of rotor blade 16 on either side of indicator rod 46 when gage 10 is placed on rotor blade 16. Indicator rod 46, between them, rests on trailing edge 20 of trim tabs 18 when guide pins 66 are pushed against trailing edge 20.

Hingedly attached to main tool plate 44 is an extension arm 70 having a first end 72 that carries a hinge 76 and opposing second end 78 that carries a leading edge roller support 82 with two rollers 86, 88 mounted so as to a engage leading edge 90 of rotor blade 16. One of these rollers 86 is mounted in a cutout portion 94 of leading edge roller support 82 so that both can be in direct engagement with the highly radiused leading edge 90. Specifically, leading edge 90 has a small radius of curvature. It is important that these rollers engage the surface of rotor blade 16 directly and from different parts of leading edge 90 including a part of leading edge 90 just around the forwardmost edge 98. Hinge 76 on first end 72 of extension arm 70 is pivotally connected to main tool plate 44 and rigidly connected to first end 72 of extension arm 70. Hinge 76 straddles roller 64.

Leading edge roller support 82, guide pins 66 and hinge 76 cooperate to allow a user to position gage 10 on rotor blade 16. When extension arm 70 is placed on rotor blade 16, leading edge roller support 82 wraps around leading edge 90 so that rollers 86, 88 engage it on either side of forwardmost edge 98. Then main tool plate 44 is pivoted down onto rotor blade 16 so that guide pins 66 swing into engagement with trailing edge 20 and trim tabs 18. Gage 10 is supported entirely by five rollers 58 (two rollers), 64, 86, 88, made of materials such as TEFLON so as not to mar the surface of rotor blade 16.

Finally an elongated hole 100 is formed in extension arm 70 so that, when gage 10 is folded, indicator rod 46 can pass through hole 100. This is the configuration required to calibrate indicator dial 32. Extension arm 70 is pivoted under main tool plate 44, with indicator rod 46 passing through hole 100, and then gage 10 is placed on gage calibration plate 14. Note also that remote wheel support arm 54 has a notch 106 formed therein dimensioned to accommodate extension arm 70 when gage 10 is folded.

Gage calibration plate 14 has a rear wall 110 with a clamp 112. Remote wheel support arm 54 of main tool plate 44 of gage 10 is placed against rear wall 110 of gage calibration plate 14 and clamp 112 is applied to second end 60 of main tool plate 44 to hold gage 10 in position on gage calibration plate 14. Indicator rod 46 is lowered to engage the top surface 116 of gage calibration plate 14. The arrow 118 on indicator dial 32 will then indicate a value that maybe other than zero. Preferably, dial ranges from −7.0 degrees to +7.0 degrees. The dial 122 of indicator dial 32 may be rotated so that the zero indication corresponds with the position of the arrow 118 to "zero" indicator dial 122. Gage 10 is thus calibrated.

When gage 10 is applied to a rotor blade 16, and indicator rod 46 is lowered to the tip of trim tabs 18 at a location along rotor blade 16, the position of the arrow 118 on indicator dial 32 will then indicate the angle of trim tab 16 at that location with respect to the horizontal. Clearly, for indicator dial 32 to be calibrated as thus described, gage calibration plate 14 must be formed to simulate a rotor blade with trim tabs oriented at zero degrees, so the height of rear wall 10 of gage calibration plate 14 must be related to the thickness of the particular type of rotor blade 16 with which gage 10 will be used; i.e, rear wall 110 must hold second end 60 of main tool plate 44 at the same height it would be held when gage 10 is mounted to a rotor blade of the type for which gage 10 is engineered. Also, modest re-engineering would be required to change the height of rear wall 110 for use in calibrating a rotor blade 16 with a different leading edge-to-trailing edge profile.

Note that gage 10 does not have to be folded to be calibrated; it is only convenient to do so and allows indicator dial 32 to be held at a slightly upward angle for viewing rather than a downward angle if not folded.

To bend trim tabs 18, bender is applied at the point where gage 10 is positioned. Bender has a broad set of jaws 126 and a narrow, thin handle 128. Jaws 126 assure an even bend along trailing edge 20 of rotor blade 16. Handle 128 provides convenient leverage for adjusting the metal trim tabs 18.

Jaws 126 have notches 130, 132 formed to receive guide pins 66 and indicator rod 46, respectively because jaws 126 are wide enough to grip the full width of trim tabs 16 (width in this case is measured from the trailing edge toward the leading edge as far as the trim tabs extend).

Jaws 126 are held in closely spaced relation by jam lock nuts 136 and thumb screws 138 so that jaws 126 will separate only wide enough to receive trim tabs 16. Also, one jaw 126 or the other or both have a flange 140 at the rearward extreme end to serve as a stop for trailing edge 20 in order to prevent application of clamp too far onto rotor blade 16.

In use, gage 10 is folded so that extension arm 70 is brought under and against main tool plate 44. Gage 10 is then placed on gage calibration plate 14 and secured thereto by clamp 112. Indicator rod 46 is lowered onto the top surface 116 of gage calibration plate 14. If the arrow 120 on dial 122 of indicator dial 32 is not pointing to a zero indication, dial 122 is rotated to align the zero with arrow 120.

Clamp 112 is then opened to release gage 10, and gage 10 is unfolded. Gage calibration plate 14 is set aside and gage 10 is then applied to a rotor blade 16 having trim tabs 18 that require adjustment. Extension arm 70 of gage 10 is extended (unfolded) and applied to leading edge 90 of rotor blade 16 so that its two rollers 86, 88 are engaging leading edge 90. Then, main tool plate 44 is rotated down unto top surface 50 of rotor blade 16 so that guide pins 66 are just touching trailing edge 20 and indicator rod 46 is resting on trim tabs 18. The arrow 120 on dial 122 of indicator dial 32 will indicate the angle trim tabs 18 depart from horizontal.

Bender is then slid onto trim tabs 18 where gage 10 is located until trailing edge 20 meets jaw flange 140 and then jaws 126 of bender are tightened with thumb screws 138. Using handle 128 of bender, trim tabs 18 are bent by the desired angle either up or down. A slight overbend is desired because of resilience in the metal trim tabs 18.

Except for the coating on jaws 126, and rollers 58, 64, 86 and 88, gage 10, bender, and gage calibration plate 14 are preferably made of a light-weight but dimensionally stable materials, such as an aluminum alloy.

It will be apparent to those skilled in the art of helicopter maintenance and trim tab adjustment in particular that many modifications and substitutions can be made to the preferred embodiments just described without departing from the spirit and scope of the present invention, which is defined by the appended claims.

What is claimed is:

1. A system for use in adjusting the trim tabs of a helicopter rotor blade, said system comprising:

gage means adapted to be applied to a helicopter rotor blade having trim tabs for indicating an angle of said trim tabs, wherein said gage means carries means for engaging said rotor blade when said gage means is applied to said rotor blade so that said gage means is able to roll freely along the length of said rotor blade; and bender means adapted to be secured to said trim tabs in spaced relation to said gage means, said bender means for adjusting said angle.

2. The system as recited in claim 1, further comprising means for calibrating said gage means.

3. The system as recited in claim 2, wherein said calibrating means further comprises:

a gage calibration plate; and means mounted to said gage calibration plate for holding said gage means in a position simulating a rotor blade with trim tabs oriented at zero degrees.

4. The system as recited in claim 1, wherein said gage means further comprises:

a main tool plate;

a hinge attached to said main tool plate; and an extension arm attached to said hinge.

5. A system for use in adjusting the trim tabs of a helicopter rotor blade, said system comprising:

a housing;

a dial indicator secured to said housing, said dial indicator having an indicator rod;

means attached to said housing for securing said housing to a helicopter rotor blade having trim tabs, said securing means adapted to position said dial indicator so that said indicator rod rests on said trim tabs in order to indicate the angle at which said trim tabs are oriented; and bender means for adjusting an angle at which said trim tabs are oriented and adapted to be secured to said trim tabs in spaced relation to said gage means and straddling said indicator rod.

6. The system as recited in claim 5, wherein said securing means carries rolling means, said rolling means supporting said securing means on said rotor blade and adapted for rolling said securing means along said rotor blade when said securing means is secured to said rotor blade.

7. The system as recited in claim 5, wherein said securing means further comprises:

a main tool plate, said housing being attached to said main tool plate;

a hinge attached to said main tool plate; and an extension arm attached to said hinge.

8. The system as recited in claim 7, wherein said main tool plate has a first end and an opposing second end, said housing being attached to said first end of said main tool plate, said extension arm having a first end and an opposing second end, said hinge being attached to said second end of said extension arm, said hinge being pivotally attached to said second end of said main tool plate.

9. The system as recited in claim 7, wherein said main tool plate carries rollers and said extension arm carries rollers, said rollers of said main tool plate and of said extension arm being adapted for supporting said securing means on said rotor blade so that said securing means is free to roll along the length of said rotor blade.

10. The system as recited in claim 5, further comprising means for calibrating said dial indicator.

11. The system as recited in claim 10, wherein said calibrating means is adapted to simulate a rotor blade with trim tabs oriented at zero degrees.

12. The system as recited in claim 10, wherein said calibrating means further comprises:

a gage calibration plate; and means mounted to said gage calibration plate for holding said securing means in a position simulating a rotor blade with trim tabs oriented at zero degrees.

13. The system as recited in claim 12, wherein said holding means further comprises:

a clamp; and a wall dimensioned to elevate said securing means above said gage calibration plate.

14. The system as recited in claim 5, wherein said bender further comprises a pair of spaced-apart jaws, said jaws having a stop to limit grip on said trim tabs.

15. A method for adjusting the orientation of trim tabs on a helicopter rotor blade, said method comprising the steps of:

calibrating a gage;

applying said gage to a helicopter rotor blade;

rolling said gage along said helicopter rotor blade to a position where trim tabs at said position require adjustment;

applying a bender to trim tabs at said position on said helicopter blade in spaced relation to said gage, said bender having a handle;

adjusting the orientation of said trim tabs at said position with said handle; and verifying said adjustment using said gage.

16. The method as recited in claim 15, further comprising the steps of:

removing said bender;

rolling said gage to a different position along said helicopter roller blade;

applying said bender to trim tabs at said different position in spaced relation to said gage;

adjusting the orientation of said trim tabs at said different position; and verifying the adjustment of said trim tabs at said different position using said gage.

17. The method as recited in claim 15, wherein said rotor blade has a leading edge and a trailing edge, and said gage has two guide pins, and wherein said applying step further comprises the steps of:

placing said gage against said leading edge of said rotor blade; and rotating said gage down onto said rotor blade so that said guide pins engage said trailing edge of said rotor blade.

18. The method as recited in claim 15, wherein said gage has a dial with a zero position and an arrow indicator, and wherein said calibrating step further comprises the steps of:

positioning said gage to simulate the orientation of a rotor blade with trim tabs at zero degrees;

rotating said dial so that said arrow indicator indicates zero on said dial.

19. The method as recited in claim 15, wherein said bender has a stop and wherein said method further comprises the step of applying said bender to said trim tabs until said trim tabs reach said stop of said bender.

20. A system for use in adjusting the trim tabs of a helicopter rotor blade, said system comprising:

gage means adapted to be applied to a helicopter rotor blade having trim tabs for indicating an angle of said trim tabs;

bender means adapted to be secured to said trim tabs in spaced relation to said gage means, said bender means for adjusting said angle;

a gage calibration plate; and means mounted to said gage calibration plate for holding said gage means in a position simulating a rotor blade with trim tabs oriented at zero degrees.

21. The system as recited in claim 20, wherein said gage means further comprises:

a main tool plate;

a hinge attached to said main tool plate; and an extension arm attached to said hinge.

22. A system for use in adjusting the trim tabs of a helicopter rotor blade, said system comprising:

gage means adapted to be applied to a helicopter rotor blade having trim tabs for indicating an angle of said trim tabs, wherein said gage means includes a main tool plate, a hinge attached to said main tool plate, and an extension arm attached to said hinge, and bender means adapted to be secured to said trim tabs in spaced relation to said gage means, said bender means for adjusting said angle.

23. The system as recited in claim 22, further comprising means for calibrating said gage means.

24. The system as recited in claim 21, wherein said gage means carries means for engaging said rotor blade when said gage means is applied to said rotor blade so that said gage means is able to roll freely along the length of said rotor blade.

* * * * *